United States Patent
Sahoo et al.

(10) Patent No.: US 11,816,190 B2
(45) Date of Patent: Nov. 14, 2023

(54) SYSTEMS AND METHODS TO ANALYZE OPEN SOURCE COMPONENTS IN SOFTWARE PRODUCTS

(71) Applicant: Tata Consultancy Services Limited, Mumbai (IN)

(72) Inventors: Subhranshu Kumar Sahoo, Bhubaneswar (IN); Sarjinder Singh Sethi, Mumbai (IN); Prasanta Panda, Bhubaneswar (IN); Anjusree Ramavarma, Kochi (IN); Shajeer Kootala Basheer, Kochi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 503 days.

(21) Appl. No.: 16/022,079

(22) Filed: Jun. 28, 2018

(65) Prior Publication Data

US 2019/0005206 A1 Jan. 3, 2019

(30) Foreign Application Priority Data

Jun. 30, 2017 (IN) .............................. 201721011464

(51) Int. Cl.
*G06F 21/10* (2013.01)
*G06F 8/71* (2018.01)
*G06F 8/75* (2018.01)

(52) U.S. Cl.
CPC .............. *G06F 21/105* (2013.01); *G06F 8/71* (2013.01); *G06F 8/75* (2013.01)

(58) Field of Classification Search
USPC ........................................................ 705/317
See application file for complete search history.

(56) References Cited

U.S. PATENT DOCUMENTS

| | | | | |
|---|---|---|---|---|
| 6,810,389 B1 * | 10/2004 | Meyer | ................... | G06Q 30/06 705/51 |
| 7,870,075 B1 * | 1/2011 | Sabet | ................... | G06F 21/105 705/52 |

(Continued)

OTHER PUBLICATIONS

Pavento, Michael S., A Practical Guide to Open Source Software, Kilpatrick Townsend & Stockton LLP Intellectual Property Desk Reference—7th Edition, May 2015, https://kilpatricktownsend.com/Insights/Publications/2015/5/A-Practical-Guide-to-Open-Source-Software (Year: 2015).*

(Continued)

*Primary Examiner* — Sarah M Monfeldt
*Assistant Examiner* — John S. Wasaff
(74) *Attorney, Agent, or Firm* — Finnegan, Henderson, Farabow, Garrett & Dunner LLP (57) ABSTRACT

Considering the number of OSS components and the number of OSS license types available today, the number of license attributes to be considered for analyzing a product at a granular level is a challenge to perform manually, prudently considering legal implications of non-compliance and contamination and also within the limited time available today before go to market in the software industry. Systems and methods of the present disclosure intelligently facilitates a matrix which is able to identify OSS components in a deliverable and also facilitates the product owner to identify proprietary IP that can be suitably protected and licensed without contamination by the accompanying OSS components in the product under consideration. License attributes of the OSS components are mapped suitably and a final attribute is derived for each OSS component embedded in the product under consideration.

10 Claims, 4 Drawing Sheets

(56) References Cited

U.S. PATENT DOCUMENTS

| | | | | |
|---|---|---|---|---|
| 8,359,655 B1* | 1/2013 | Pham | G06F 21/12 | 370/486 |
| 8,401,973 B1* | 3/2013 | Biswas | G06F 9/44526 | 705/59 |
| 10,747,852 B1* | 8/2020 | Dalessio | G06F 21/10 | |
| 2002/0138441 A1* | 9/2002 | Lopatic | G06F 21/125 | 705/59 |
| 2002/0138764 A1* | 9/2002 | Jacobs | G06F 21/10 | 726/28 |
| 2002/0194010 A1* | 12/2002 | Bergler | G06Q 10/10 | 705/310 |
| 2004/0068734 A1* | 4/2004 | Bond | G06F 8/00 | 719/328 |
| 2005/0125358 A1* | 6/2005 | Levin | G06Q 10/10 | 705/59 |
| 2005/0216898 A1* | 9/2005 | Powell, Jr. | G06F 16/80 | 717/114 |
| 2006/0036652 A1* | 2/2006 | Cope | G06F 8/71 | |
| 2007/0033154 A1* | 2/2007 | Trainum | G06F 16/93 | |
| 2007/0271190 A1* | 11/2007 | Foster | G06F 21/105 | 705/59 |
| 2008/0154965 A1* | 6/2008 | Pedersen | G06F 21/10 | |
| 2008/0209393 A1 | 8/2008 | Evensen et al. | | |
| 2008/0209399 A1* | 8/2008 | Bonnet | G06Q 10/10 | 717/122 |
| 2008/0256516 A1* | 10/2008 | Chaar | G06F 8/36 | 717/121 |
| 2010/0185686 A1* | 7/2010 | Weigert | G06F 21/10 | 707/803 |
| 2010/0241469 A1 | 9/2010 | Weigert | | |
| 2011/0302623 A1* | 12/2011 | Ricci | G06F 21/105 | 726/1 |
| 2012/0240096 A1* | 9/2012 | Sass | G06F 8/75 | 717/101 |
| 2013/0091488 A1* | 4/2013 | Koutyrine | G06F 8/77 | 717/120 |
| 2013/0167135 A1* | 6/2013 | Neumann | G06F 9/44552 | 717/174 |
| 2013/0254744 A1 | 9/2013 | Sahoo et al. | | |
| 2014/0289159 A1* | 9/2014 | Das | G06Q 30/0282 | 705/347 |
| 2015/0169321 A1* | 6/2015 | Rissell | G06F 8/70 | 717/121 |
| 2015/0356280 A1 | 12/2015 | Lori | | |
| 2016/0019056 A1* | 1/2016 | Rohan | G06F 8/71 | 717/123 |
| 2016/0202972 A1 | 7/2016 | Sass et al. | | |
| 2016/0292066 A1* | 10/2016 | Stevens | G06F 11/3604 | |

OTHER PUBLICATIONS

Gangadharan, G. R., D'Andrea, V., De Paoli, S., & Weiss, M. (2012). Managing license compliance in free and open source software development. Information Systems Frontiers, 14, 143-154. (Year: 2012).*

* cited by examiner

SYSTEMS AND METHODS TO ANALYZE OPEN SOURCE COMPONENTS IN SOFTWARE PRODUCTS

PRIORITY CLAIM

This U.S. patent application claims priority under 35 U.S.C. § 119 to: Indian Patent Application No. 201721011464, filed on 30 Mar. 2017 and post-dated to 30 Jun. 2017. The entire contents of the aforementioned application are incorporated herein by reference.

TECHNICAL FIELD

The disclosure herein generally relates to open source compliance management, and, more particularly to systems and methods for analyzing open source components in software products.

BACKGROUND

Use of Open source software (OSS) involves compliance with associated licenses that define specific rights made available by the copyright holder of OSS. Such compliance implies compliance with conditions associated with each component of OSS including fragments or sub-components. Currently there are approximately more than 12 lakh OSS components available under more than 2000 OSS license types. The large volume makes it challenging to analyze the OSS components technically and legally while developing a proprietary product and ensure OSS compliance at software packaging level, delivery level and compilation level.

SUMMARY

Embodiments of the present disclosure present technological improvements as solutions to one or more of the above-mentioned technical problems recognized by the inventors in conventional systems.

In an aspect, there is provided a processor implemented method comprising: receiving, a product under consideration embedded with one or more Open Source Software (OSS) components; comparing each of the one or more OSS components in the product under consideration with OSS components available in the public domain and comprised in a first OSS database (DB1) to identify one or more matches therebetween based on attributes associated thereof; categorizing, the one or more OSS components in the product under consideration having a match with the OSS components available in the first OSS database (DB1) as (i) OSS components having a strong copyleft license, (ii) OSS components having a permissive license or (iii) OSS components having a weak copyleft; identifying a usage type for the one or more OSS components in the product under consideration categorized as having the weak copyleft license and the permissive license, wherein the license usage type is one of a snippet, a file or a library and wherein the library is further identified as one of a library-executable or a library-binary; identifying as one or more unidentified components, the one or more OSS components in the product under consideration having no match with the OSS components available in the first OSS database (DB1) or having a match but characterized by at least one missing attribute; periodically comparing the one or more unidentified components with the OSS components in the first OSS database (DB1) to identify one or more new matches based on continual updation of OSS components available in the public domain; updating a second OSS database (DB2) comprising at least some of the one or more OSS components in the product under consideration having the one or more matches, the one or more new matches, the one or more unidentified components categorized as one or more proprietary components and OSS components previously available in the public domain; performing an OSS compliance analyses for the one or more OSS components in the product under consideration based on the usage type, the attributes associated thereof comprised in the second OSS database (DB2) and one or more pre-defined rules; and generating a comprehensive report (R5) based on the OSS compliance analyses, wherein the comprehensive report (R5) includes a final attribute for each of the one or more OSS components in the product under consideration indicative of compliance with the attributes of each of the one or more OSS components comprised therein.

In another aspect, there is provided a system comprising: one or more data storage devices operatively coupled to the one or more processors and configured to store instructions configured for execution by the one or more processors to: receive, a product under consideration embedded with one or more Open Source Software (OSS) components; compare each of the one or more OSS components in the product under consideration with OSS components available in the public domain and comprised in a first OSS database (DB1) to identify one or more matches therebetween based on attributes associated thereof; categorize, the one or more OSS components in the product under consideration having a match with the OSS components available in the first OSS database (DB1) as (i) OSS components having a strong copyleft license, (ii) OSS components having a permissive license or (iii) OSS components having a weak copyleft; identify a usage type for the one or more OSS components in the product under consideration categorized as having the weak copyleft license and the permissive license, wherein the license usage type is one of a snippet, a file or a library and wherein the library is further identified as one of a library-executable or a library-binary; identify as one or more unidentified components, the one or more OSS components in the product under consideration having no match with the OSS components available in the first OSS database (DB1) or having a match but characterized by at least one missing attribute; periodically compare the one or more unidentified components with the OSS components in the first OSS database (DB1) to identify one or more new matches based on continual updation of OSS components available in the public domain; update a second OSS database (DB2) comprising the one or more OSS components in the product under consideration having the one or more matches, the one or more new matches, the one or more unidentified components categorized as one or more proprietary components and OSS components previously available in the public domain; perform an OSS compliance analyses for the one or more OSS components in the product under consideration based on the usage type, the attributes associated thereof comprised in the second OSS database (DB2) and one or more pre-defined rules; and generate a comprehensive report (R5) based on the OSS compliance analyses, wherein the comprehensive report (R5) includes a final attribute for each of the one or more OSS components in the product under consideration indicative of compliance with the attributes of each of the one or more OSS components comprised therein.

In yet another aspect, there is provided a computer program product comprising a non-transitory computer readable medium having a computer readable program embodied therein, wherein the computer readable program, when executed on a computing device, causes the computing device to: receive, a product under consideration embedded with one or more Open Source Software (OSS) components; compare each of the one or more OSS components in the product under consideration with OSS components available in the public domain and comprised in a first OSS database (DB1) to identify one or more matches therebetween based on attributes associated thereof; categorize, the one or more OSS components in the product under consideration having a match with the OSS components available in the first OSS database (DB1) as (i) OSS components having a strong copyleft license, (ii) OSS components having a permissive license or (iii) OSS components having a weak copyleft; identify a usage type for the one or more OSS components in the product under consideration categorized as having the weak copyleft license and the permissive license, wherein the license usage type is one of a snippet, a file or a library and wherein the library is further identified as one of a library-executable or a library-binary; identify as one or more unidentified components, the one or more OSS components in the product under consideration having no match with the OSS components available in the first OSS database (DB1) or having a match but characterized by at least one missing attribute; periodically compare the one or more unidentified components with the OSS components in the first OSS database (DB1) to identify one or more new matches based on continual updation of OSS components available in the public domain; update a second OSS database (DB2) comprising the one or more OSS components in the product under consideration having the one or more matches, the one or more new matches, the one or more unidentified components categorized as one or more proprietary components and OSS components previously available in the public domain; perform an OSS compliance analyses for the one or more OSS components in the product under consideration based on the usage type, the attributes associated thereof comprised in the second OSS database (DB2) and one or more pre-defined rules; and generate a comprehensive report (R5) based on the OSS compliance analyses, wherein the comprehensive report (R5) includes a final attribute for each of the one or more OSS components in the product under consideration indicative of compliance with the attributes of each of the one or more OSS components comprised therein.

In an embodiment of the present disclosure, the one or more hardware processors are further configured to generate one or more reports comprising: a first report (R1) pertaining to the one or more unidentified components; a second report (R2) pertaining to the one or more OSS components in the product under consideration having the strong copyleft license; a third report (R3) pertaining to the one or more OSS components in the product under consideration having the weak copyleft license; and a fourth report (R4) pertaining to the one or more OSS components in the product under consideration having the permissive license.

In an embodiment of the present disclosure, the one or more hardware processors are further configured to adaptively learn the one or more OSS components and the attributes associated thereof comprised in the comprehensive report (R5) and update the second OSS database (DB2).

In an embodiment of the present disclosure, at least the second OSS database (DB2) has a pre-defined format comprising the attributes including OSS component name, OSS component version, OSS component home page URL, OSS component license type, OSS component license URL, OSS component attribution note, license usage type, commercial distribution permission, OSS component compile permission, license compatibility with the OSS component license type associated with other OSS components comprised in the product or compatibility with proprietary license.

In an embodiment of the present disclosure, the one or more hardware processors are further configured to perform the OSS compliance analyses by: combining the first report (R1), the second report (R2), the third report (R3) and the fourth report (R4); and generating the final attribute, wherein the one or more pre-defined rules comprise: Rule 1 wherein an OSS component is rejected if associated with the strong copy left license; Rule 2 wherein an OSS component is approved for inclusion in the second OSS database (DB2) if associated with the weak copy left license and the OSS usage type is one of the library not compiled with the product or the file not compiled with the product; Rule 3 wherein an OSS component is rejected if associated with the weak copy left license and the OSS usage type is the snippet; Rule 4 wherein an OSS component is approved for inclusion in the second OSS database (DB2) if associated with the permissive license and the OSS usage is one of the library, the snippet, or the file; and Rule 5 wherein an OSS component is rejected if associated with the weak copy left license and the OSS usage type is one of the library compiled with the product or the file compiled with the product.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Systems and methods of the present disclosure aim to overcome legal complications that may arise when using open source software (OSS) in a production environment. Solutions that implement open source software components are enforced by open source license terms and conditions such as General Public License (GPL), Lesser General Public License (LGPL), Massachusetts Institute of Technology (MIT) License, Berkeley Software Distribution (BSD), Apache, and the like. These open source licenses have their own attributes which specify distribution rights, sublicense rights, packaging rights, code matches, binary matches, and the like. These attributes differ depending on the license types, permissible usage, license terms, expiry of terms, scope of usage, warranty, etc. There are approximately 2000 license types in the OSS world today which govern more than 12 lakh OSS components. The number of attributes may therefore be at least 10 times more than the license types when summed. The present disclosure provides intelligence to categories of OSS components in such a manner that the systems and methods of the present disclosure can read the categorization logically and can provide appropriate compliance output.

Figure 1:
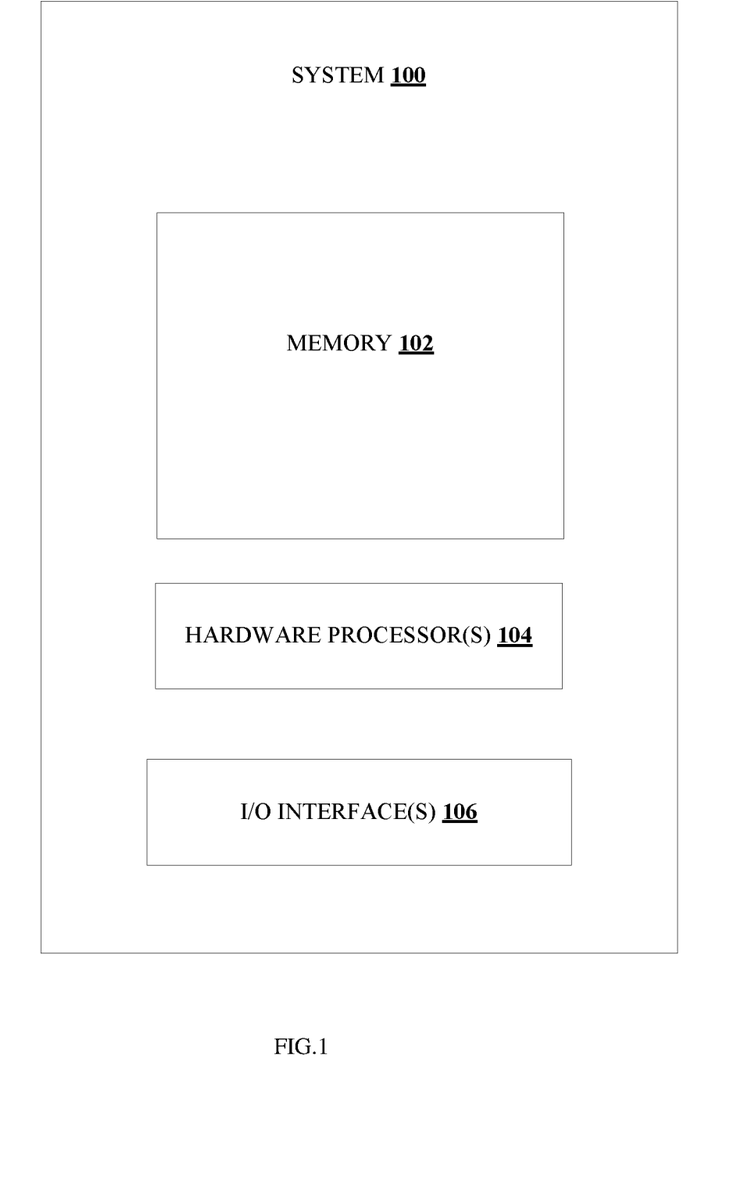
FIG. 1 illustrates an exemplary block diagram of a system to analyze open source components in software products, in accordance with an embodiment of the present disclosure.
Figure 2A:
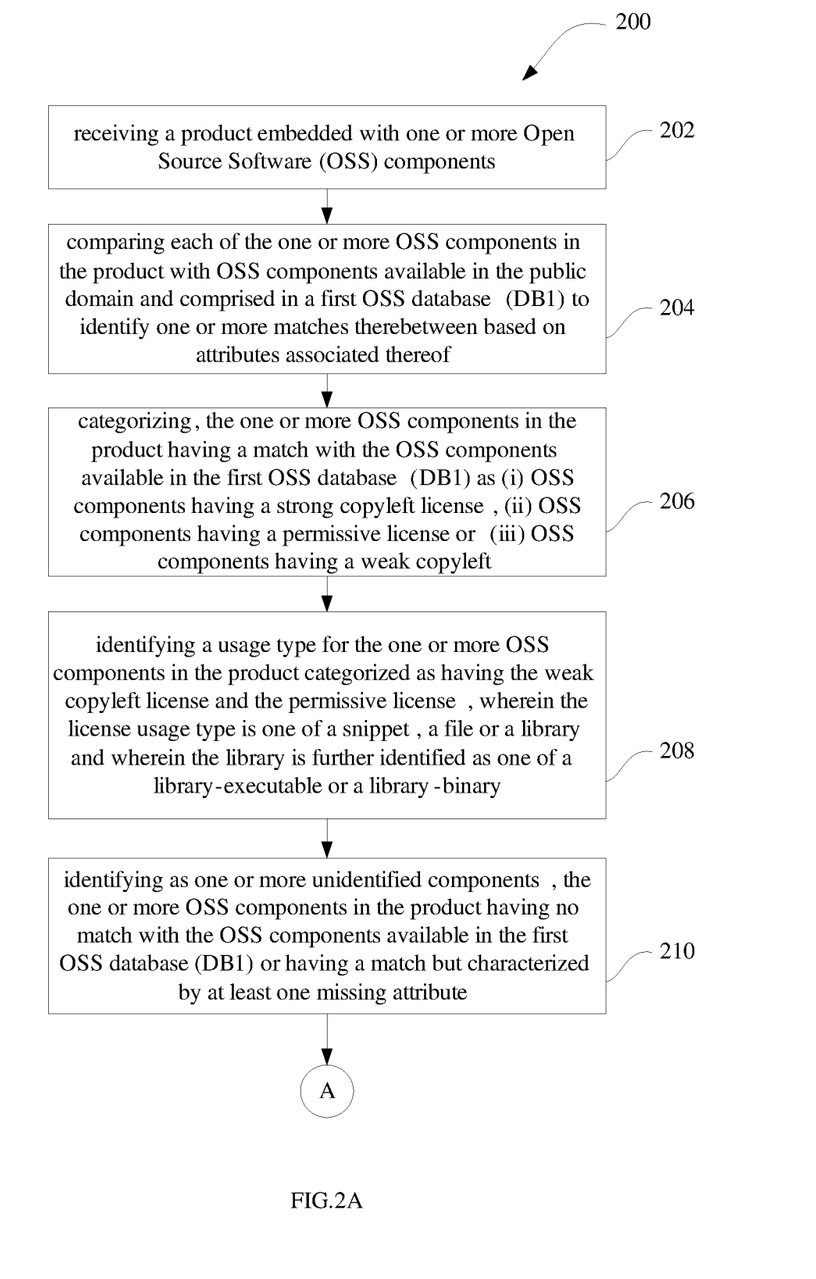
FIG. 2A through FIG. 2B illustrates an exemplary flow diagram for a computer implemented method to analyze open source components in software products, in accordance with an embodiment of the present disclosure.
Figure 2B:
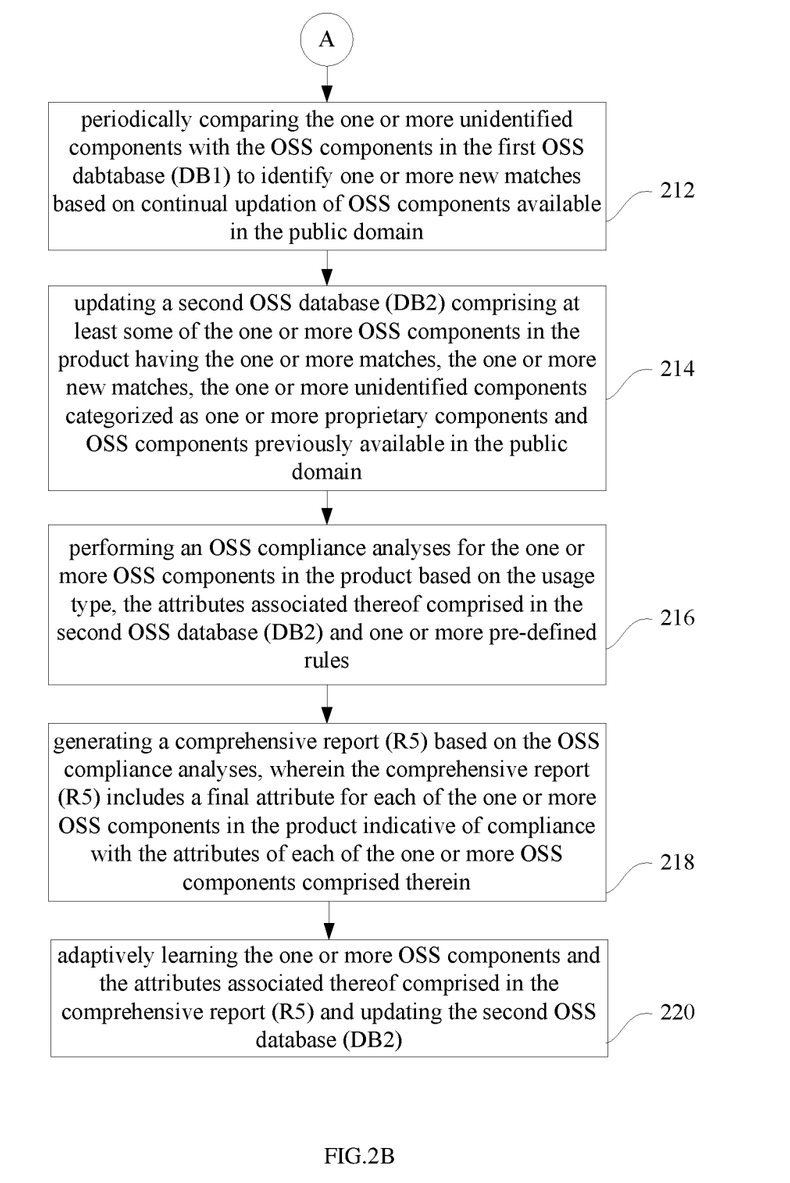
Figure 3:
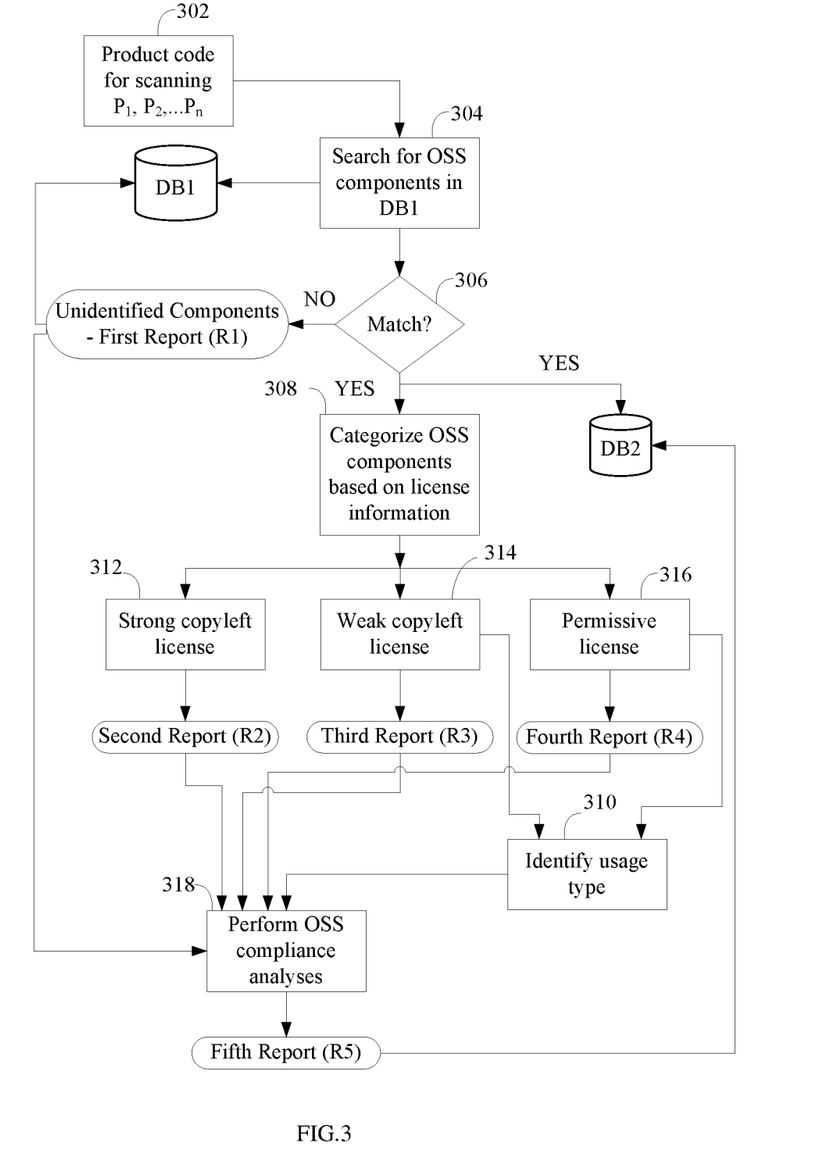
FIG. 3 illustrates an exemplary flow chart for the computer implemented method of FIG. 2A through FIG. 2B, in accordance with an embodiment of the present disclosure.

Referring now to the drawings, and more particularly to FIG. 1 through 3, where similar reference characters denote corresponding features consistently throughout the figures, there are shown preferred embodiments and these embodiments are described in the context of the following exemplary system and/or method.

FIG. 1 illustrates an exemplary block diagram of a system 100 to analyze open source components in software products, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

FIG. 2A through FIG. 2B illustrates an exemplary flow diagram for a computer implemented method 200 and FIG. 3 illustrates an exemplary flow chart 300 for the method 200 to analyze open source components in software products, in accordance with an embodiment of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1 and the components of the flow chart 300 of FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

In an embodiment of the present disclosure, the one or more processors 104 are configured to receive, at step 202, a product under consideration embedded with one or more Open Source Software (OSS) components. It may be understood that in the context of the present disclosure, the expression 'product' used herein refers to a software product.

Let DB1 represent a first Open Source Software (OSS) database of OSS components available in the public domain. The first OSS database (DB1) may be available in the public domain or may be populated by the system 100 of the present disclosure based on OSS components available in the public domain. An exemplary public OSS database DB1 with OSS components having exemplary attributes may be represented as shown in Table 1 herein below.

TABLE 1

| OSS | Component | Version | Home Page | License Types |
|---|---|---|---|---|
| O1 | Android-N810 | | http://sourceforge.net/projects/android-n810/ | Apache License 2.0 |
| O2 | Android-Support | 4 | http://developer.android.com/tools/support-library/setup.html#download | Apache License 2.0 |
| O3 | Android-Support | 4 | http://developer.android.com/tools/support-library/setup.html#download | Apache License 2.0 |
| O4 | quartz-web | trunk-20120509-svn | http://code.google.com/p/quartz-web/ | dom4j License (BSD 2.0+) |
| O5 | revertools | | http://code.google.com/p/revertools/ | MIT License |
| O6 | wpadk | | http://wpadk.codeplex.com/ | Oracle JRE 6 and JavaFX Binary Code Updated License |

TABLE 1-continued

| OSS | | | | |
|---|---|---|---|---|
| O7 | xstream-1.3.1.jar | 1.3.1 | http://central.maven.org/maven2/com/thoughtworks/xstream/xstream/1.3.1/xstre | Public Domain |
| O8 | anhhoang | trunk- | http://code.google.com/p/anhhoang/ | Eclipse Public License 1.0 |
| O9 | Coova J Radius | 1.0.0 | http://www.coova.org/JRadius | GNU Lesser General Public License v3.0 or later |
| O10 | easyC | secondglimpse | http://sourceforge.net/projects/easyc/ | Eclipse Public License 1.0 |
| O11 | MySql | | https://www.mysql.com/downloads/ | GPL |

| OSS | License URL | Usage | Ship Status | Attribution Note |
|---|---|---|---|---|
| O1 | http://www.apache.org/licenses/LICENSE-2.0 | Component (Dynamic Library) | Ship | Copyright (C) 2012 The Android Open Source |
| O2 | http://www.apache.org/licenses/LICENSE-2.0 | File | Ship | © 2004-2011 The Apache Software |
| O3 | http://www.apache.org/licenses/LICENSE-2.0 | Snippets | Ship | © 2004-2011 The Apache Software |
| O4 | http://dom4j.sourceforge.net/license.html | | | Copyright 2001-2010 (C) MetaStuff |
| O5 | http://opensource.org/licenses/MIT | | | Copyright © by bollton2010 |
| O6 | http://www.oracle.com/technetwork/java/javase/downloads/jce-6-download-429243.html | | | Copyright © 1995-2016, Oracle |
| O7 | http://creativecommons.org/licenses/publicdomain/ | | | Copyright(c) by aopalliance |
| O8 | http://www.eclipse.org/legal/epl-v10.html | | | Copyright © by anhhoang1109 |
| O9 | http://www.gnu.org/licenses/lgpl-3.0.en.html | | | Copyright 2006-2010 Coova |
| O10 | http://www.eclipse.org/legal/epl-v10.html | | | Copyright © 2002-2016. |
| O11 | https://www.gnu.org/licenses/gpl-3.0.en.html | | | © 2016, Oracle |

In an embodiment, a product under consideration embedded with one or more Open source software (OSS) components that need to be analyzed for OSS compliance and also prevent OSS contamination of proprietary components is received by the system 100 of the present disclosure at step 202 (FIG. 2A). As seen in the flow chart of FIG. 3, different versions of a product $P_1, P_2, \ldots P_n$ are received at block 302. The OSS components of the product under consideration is compared at block 304 (FIG. 3) with OSS components available in the first OSS database DB1 at step 204 (FIG. 2A) to identify one or more matches therebetween based on component attributes and license attributes associated thereof. At block 306 (FIG. 3) there is check for a match, if any. In an embodiment, the one or more OSS components having a match with the OSS components available in the public OSS database (DB1) are categorized based on associated attributes at step 206 (FIG. 2A) and block 308 (FIG. 3). In an embodiment the various categories may include (i) OSS components having strong copyleft license such as General Public License (GPL) or Affero General Public License (AGPL) (ii) permissive license such as Massachusetts Institute of Technology (MIT) License or Apache or (iii) weak copyleft or free public license such as Lesser General Public License (LGPL), Mozilla Public License (MPL), Eclipse Public License (EPL) and the like.

In an embodiment, the one or more processors 104 are configured to identify, at step 208 (FIG. 2A) and block 310 (FIG. 3) a usage type for the one or more OSS components in the product under consideration categorized as having the weak copyleft license and the permissive license. In an embodiment, the license usage type may be one of a snippet, a file or a library, wherein the library may be further identified as one of a library-executable or a library-binary type.

The OSS components of the product under consideration having no match or having a match but characterized by one or more missing attributes are identified as unidentified components at step 210 (FIG. 2A) and at block 306 (FIG. 3).

The OSS components available in the public domain and comprised in the first OSS database (DB1) are updated continually based information available via the World Wide Web. Therefore, in accordance with an embodiment of the present disclosure, the one or more processors 104 are configured to periodically compare, at step 212 (FIG. 2B) the unidentified components from step 210 (FIG. 2A) and block 306 (FIG. 3) with the OSS components in the first OSS database (DB1) to identify one or more new matches.

Furthermore, in accordance with the present disclosure a customized knowledge base is adaptively learnt in the form of a second OSS database (DB2), at step 214 (FIG. 2B). In an embodiment, the second OSS database (DB2) comprises the one or more matches from step 204 (FIG. 2A) and the one or more new matches from step 212 (FIG. 2B). In an embodiment, the unidentified components may be categorized as proprietary components to be packaged suitable. Accordingly, in an embodiment, the second OSS database (DB2) also comprises the one or more unidentified components from step 210 (FIG. 2A) categorized as proprietary components and also OSS components previously available in the public domain.

In an embodiment, at least the second OSS database (DB2) has a pre-defined format comprising the attributes including OSS component name, OSS component version, OSS component home page URL, OSS component license type, OSS component license URL, OSS component attribution note, license usage type, commercial distribution permission, OSS component compile permission, license compatibility with the OSS component license type associated with other OSS components comprised in the product or compatibility with proprietary license. The pre-defined format is configured to facilitate faster retrieval of information comprised therein as compared to fetching information based on metadata.

In an embodiment, the second OSS database (DB2) having exemplary attributes may be represented as shown in Table 2 herein below.

or more unidentified components may be generated at block 306 (FIG. 3); a second report (R2) pertaining to the pertaining to the one or more OSS components in the product under consideration having the strong copyleft license may be generated at block 312 (FIG. 3); a third report (R3) pertaining to the one or more OSS components in the product under consideration having the weak copyleft license may be generated at block 314 (FIG. 3); and a fourth report (R4) pertaining to the one or more OSS components in the

TABLE 2

| OSS | Component | Version | Home Page |
|---|---|---|---|
| O1 | hibernatecommonsannotations.jar | | http://central.maven.org/maven2/org/hibernate/hibernate-commons-annotations/3.3.0.ga/hibernate-commons-annotations-3.3.0.ga.pom |
| O2 | hibernatecommonsannotations.c | | http://central.maven.org/maven2/org/hibernate/hibernate-commons-annotations/3.3.0.ga/hibernate-commons-annotations-3.3.0.ga.pom |
| O3 | hibernatecommonsannotations.c | | http://central.maven.org/maven2/org/hibernate/hibernate-commons-annotations/3.3.0.ga/hibernate-commons-annotations-3.3.0.ga.pom |
| O4 | mchange-commons-java | 0.2.2 | http://github.com/swaldman/mchange-commons-java/ |
| O5 | mchange-commons.Jar | 0.2.2 | http://github.com/swaldman/mchange-commons-java/ |
| O6 | Mchange.Jar | 0.2.2 | http://github.com/swaldman/mchange-commons-java/ |
| O7 | JackRabit.jar | 01 | https://apachekackrabit.com |
| O8 | JackRabit.jar | 01 | https://apachekackrabit.com |
| O9 | JackRabit.jar | 01 | https://apachekackrabit.com |
| O10 | Firefox.jar | 11 | Firefox.com |
| O11 | Flipbox.java | 11 | Flipbox.com |
| O12 | Flipbox.c | 11 | Flipbox.com |

| OSS | License type | License URL | Usage |
|---|---|---|---|
| O1 | GNU Lesser General Public License v3.0 or later | http://www.gnu.org/licenses/lgpl-3.0.en.html | Component (Dynamic Library) |
| O2 | GNU Lesser General Public License v3.0 or later | http://www.gnu.org/licenses/lgpl-3.0.en.html | File |
| O3 | GNU Lesser General Public License v3.0 or later | http://www.gnu.Org/licenses/lgpl-3.0.en.html | Snippets |
| O4 | General public license | http://www.gnu.org/licenses/lgpl-2.1.html | Component (Dynamic Library) |
| O5 | General public license | http://www.gnu.org/licenses/lgpl-2.1.html | File |
| O6 | General public license | http://www.gnu.org/licenses/lgpl-2.1.html | Snippets |
| O7 | Apache license | https://www.apache.org/licenses/LICENSE-2.0 | Component |
| O8 | Apache license | https://www.apache.org/licenses/LICENSE-2.0 | File |
| O9 | Apache license | https://www.apache.org/licenses/LICENSE-2.0 | Snippet |
| O10 | Mozilla license | https://en.wikipedia.org/wiki/Mozilla_Public_License | Component |
| O11 | Mozilla license | https://en.wikipedia.org/wiki/Mozilla_Public_License | File |
| O12 | Mozilla license | https://en.wikipedia.org/wiki/Mozilla_Public_License | File |

| OSS | Distributable | Attribution Note | Compile | License compatibility with proprietary license/code |
|---|---|---|---|---|
| O1 | Yes | Copyright (c) 2008, Red Hat Middleware LLC | No | Yes |
| O2 | Yes | Copyright (c) 2008, Red Hat Middleware LLC | No | No |
| O3 | No | Copyright (c) 2008, Red Hat Middleware LLC | No | No |
| O4 | No | Copyright (C) 1991, 1999 Free Software Foundation, | No | No |
| O5 | No | Copyright (C) 1991, 1999 Free Software Foundation, | No | No |
| O6 | NO | Copyright (C) 1991, 1999 Free Software Foundation, | No | No |
| O7 | Yes | © jackrabbit | Yes | Yes |
| O8 | Yes | © jackrabbit | Yes | Yes |
| O9 | Yes | © jackrabbit | Yes | Yes |
| O10 | Yes | © Mozilla | Yes | Yes |
| O11 | No | © Flipbox | No | No |
| O12 | No | © Flipbox | No | No |

In an embodiment, the one or more processors 104 are configured to generate one or more reports, at step 222. For instance, post identification of the unidentified components at step 210 (FIG. 2A), a first report (R1) pertaining to the one product under consideration having the permissive license may be generated at block 316 (FIG. 3).

In an embodiment, the one or more processors 104 are configured to perform an OSS compliance analyses, at step

216 (FIG. 2B) and block 318 (FIG. 3), for the one or more OSS components in the product under consideration based on the usage type identified at step 210 (FIG. 2A), the attributes associated thereof comprised in the second OSS database (DB2) and one or more pre-defined rules. Further, the one or more processors 104 are configured to generate a comprehensive report (R5), at step 218 (FIG. 2B) based on the OSS compliance analyses performed at step 216 (FIG. 2B). In an embodiment, the comprehensive report (R5) includes a final attribute for each of the one or more OSS components in the product under consideration indicative of compliance with the attributes of each of the one or more OSS components comprised therein.

In an embodiment, an exemplary comprehensive report (R5) may be as represented in Table 3 below.

TABLE 3

| OSS | Component | Version | Home Page | License type | License URL | Usage | Distributable | Attribution Note |
|---|---|---|---|---|---|---|---|---|
| o1 | a | 1.0 | www.a.com | abc license | www.abc.com | file | yes | © a.com |
| o2 | b | 2.0 | www.b.com | bcd licese | www.bcd.com | component | yes | © b.com |
| o3 | c | 1.5 | www.c.com | enf licese | www.enf.com | snippets | yes | © c.com |
| o4 | d | 2.1 | www.d.com | ghi licese | www.ghi.com | file | yes | © d.com |

In an embodiment of the present disclosure, the step of performing an OSS compliance comprises firstly combining the first report (R1), the second report (R2), the third report (R3) and the fourth report (R4). The final attribute is then generated, wherein the pre-defined rules, in accordance with an embodiment of the present disclosure, may include:

Rule 1 wherein an OSS component is rejected if associated with the strong copy left license;

Rule 2 wherein an OSS component is approved for inclusion in the second OSS database (DB2) if associated with the weak copy left license and the OSS usage type is one of the library not compiled with the product or the file not compiled with the product;

Rule 3 wherein an OSS component is rejected if associated with the weak copy left license and the OSS usage type is the snippet;

Rule 4 wherein an OSS component is approved for inclusion in the second OSS database (DB2) if associated with the permissive license and the OSS usage is one of the library, the snippet or the file; and Rule 5 wherein an OSS component is rejected if associated with the weak copy left license and the OSS usage type is one of the library compiled with the product or the file compiled with the product.

Further to Table 3 above, the final attribute in an exemplary comprehensive report (R5) may be generated as shown in Table 4 herein below.

TABLE 4

| OSS | Commercialization (Com) (Yes(Y)), No (N) | Snippets (Snip) (Yes(Y)), No (N) | Modify (mod) (Yes(Y)), No (N) | File (Fil) (Yes (Y)), No (N) | Components (Static Library) (Comps) (Yes(Y)), No (N) | Components (Dynamic Library) (Compd) (Yes(Y)), No (N) | Distribute with Proprietary code (DP) (Yes(Y)), No (N) | Compile with Proprietary code (CP) (Yes(Y)), No (N) | Final attribute |
|---|---|---|---|---|---|---|---|---|---|
| O1 | Y | Y | N | Y | Y | N | N | Y | O1ComY, O1SnipY, O1ModN, O1FilY, O1CompsY, O1CompdN, O1DPN, O1CPY |
| O2 | Y | Y | N | N | N | Y | Y | N | O2ComY, O2SnipY, O2ModN, O2FilN, O2CompsN, O2CompdY, O2DPY, O2CPN |

.
.
.

TABLE 4-continued

| OSS | Commercialization (Com) (Yes(Y)), No (N) | Snippets (Snip) (Yes(Y)), No (N) | Modify (mod) (Yes(Y)), No (N) | File (Fil) (Yes (Y)), No (N) | Components (Static Library) (Comps) (Yes(Y)), No (N) | Components (Dynamic Library) (Compd) (Yes(Y)), No (N) | Distribute with Proprietary code (DP) (Yes(Y)), No (N) | Compile with Proprietary code (CP) (Yes(Y)), No (N) | Final attribute |
|---|---|---|---|---|---|---|---|---|---|
| On | N | N | N | Y | Y | N | Y | Y | OnComN, OnSnipN, OnModN, OnFilY, OnCompsY, OnCompdN, OnDPY, OnCPY |

When the final attribute values generated are "Y" for all the OSS components used in a product under consideration, it may be deemed as compliant with attributes of each of the one or more OSS components comprised therein and accordingly safe to use. The above mentioned attributes Commercialization (Com), Snippets(Snip), Modify (Mod) are primarily indicative of the attributes for Open source components used as part of software development; whereas the attributes File (Fil), Components (Static Library) (Comps), Components (Dynamic Library) (Compd) indicate how listed open source components may be used as part of software development. Again, the attributes Distribute with Proprietary code (DP), Compile with Proprietary code (CP) indicate whether the open source component can be compiled with proprietary product code (P1, P2 . . . Pn) and can be distributed with proprietary product code (P1, P2 . . . Pn).

In an embodiment, all the OSS components listed in the second OSS database (DB2) may have defined associated attributes as illustrated in tables herein above. For example Commercialization (Com) may be O1Com, Snippets (Snip) may be O1Snip, Modify (Mod) may be O1Mod, File (Fil) may be O1Fil, Components (Static Library) (Comps) may be O1Comps, Components (Dynamic Library) (Compd) may be O1Compd etc. Further the attributes of each OSS components may be Yes or No based on the determination of commercial usage applicability. For example, if Commercialization (Com) for O1 is Yes then the parameter may be O1ComY. If Commercialization (Com) for O1 is No, then the parameter may be O1ComN. Likewise for Snip, the values are O1 SnipY and O1SnipN, for Mod, the values are O1ModY and O1ModN, for Fil, the values are O1FilY and O1FilN, for Comps, the values are O1CompsY and O1CompsN, for Compd, the values are O1CompdY and O1CompdN etc.

Based on the final attribute generated, the system 100 determines which of the OSS components may be selected for deliverable. Further, there may be scenarios wherein some of the OSS components are compliant and can be part of a final deliverable but cannot be compiled. For example weak copyleft license (GNU lesser general public license, Sun Binary code license as like). In an embodiment, the system is configured to create a list of OSS components which may be compiled with proprietary code; and another set of OSS components which may be part of a final deliverable but may not be compiled.

In an embodiment, the system 100 is configured to define usage of open source components as Snippets (Snip), File (Fil), Components (Static Library) (Comps), Components (Dynamic Library) (Compd), Further the system 100 may be configured to determine if a component is modified. In an embodiment, if the usage is snippets (Snip) for any open source component, then the associated attribute is modification.

In an embodiment the second OSS database (DB2) may be updated with the one or more OSS components and associated attributes comprised in the comprehensive report (R5), at step 220 (FIG. 2) thereby enhancing the customized knowledge database via adaptive learning. It may be noted that the first time a product is received for analyzing the OSS components comprised therein, the second OSS database (DB2) may be empty. The adaptive learning updates the second OSS database (DB2) at step 214 (FIG. 2B).

Thus intelligence associated with the systems and methods of the present disclosure facilitate a matrix, by analyzing a set of OSS components (refer Table 2, Table 3 and Table 4 of DB2) to identify OSS components that may be compiled in a final deliverable and also facilitate the product owner to identify proprietary intellectual property that may be suitably protected and licensed without contamination by the accompanying OSS components in the product under consideration. An analysis of the OSS components and their attributes in consideration with the pre-defined rules ensure that inter-license compatibilities are checked and compliance with respect to compilation and distribution in a final deliverable is achieved, thereby ensuring that the OSS components retained in the final deliverable retain their intellectual property. For instance, a final deliverable may be P1 and/or P2 and/or . . . Pn while enforcing proprietary End User License Agreement (PEULA).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g.

an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method comprising:
receiving a product embedded with one or more Open Source Software (OSS) components;
comparing each of the one or more OSS components in the product with OSS components available in the public domain and comprised in a first OSS database (DB1) to identify one or more matches there between based on attributes associated thereof;
categorizing, the one or more OSS components in the product having a match with the OSS components available in the first OSS database (DB1) as (i) OSS components having a strong copyleft license, (ii) OSS components having a permissive license or (iii) OSS components having a weak copyleft license;
identifying a license usage type for the one or more OSS components in the product categorized as having the weak copyleft license and the permissive license, wherein an OSS usage type is one of a snippet, a file or a library and wherein the library is further identified as one of a library-executable or a library-binary type;
defining the OSS usage type of the one or more OSS components as snippets (Snip), file (Fil), a Static library (Comps), a dynamic library(Compd), and determining if a component is modified, wherein when the usage type is the snippets (Snip) for the OSS component then the component to have attribute of modification, and the snippets (Snip) is indicative of one or more attributes for the one or more OSS components used as part of software development and wherein the Static library (Comps) and the dynamic library (Compd) is indicative of one or more listed open source components being used as part of software development;
identifying as one or more unidentified components, the one or more OSS components in the product having no match with the OSS components available in the first OSS database (DB1) or having a match but characterized by at least one missing attribute;
periodically comparing the one or more unidentified components with the OSS components in the first OSS database (DB1) to identify one or more new matches, wherein the OSS components available in the public domain and comprised in the first OSS database (DB1) are updated continually based on information available in a world wide web;
updating a second OSS database (DB2) comprising at least some of the one or more OSS components in the product having the one or more new matches, wherein the one or more new matches, the one or more unidentified components are categorized as at least of the one or more proprietary components and OSS components being previously available in the public domain;
performing an OSS compliance analysis for the one or more OSS components in the product based on the usage type, the attributes associated thereof comprised in the second OSS database (DB2) and one or more pre-defined rules, wherein the attributes are stored in the second OSS database (DB2) in a pre-defined format that facilitates faster retrieval of information from the second OSS database (DB2), wherein the attributes stored in the second OSS database (DB2) in the pre-defined format include OSS component name, followed by OSS component version, followed by OSS component home page URL, followed by OSS component license type, followed by OSS component license URL, followed by OSS component attribution note, followed by the license usage type, followed by commercial distribution permission, followed by OSS component compile permission, followed by license compatibility with the OSS component license type associated with other OSS components comprised in the product or compatibility with proprietary license;

generating a comprehensive report (R5) based on the OSS compliance analyses, wherein the comprehensive report (R5) includes a final attribute for each of the one or more OSS components in the product indicative of compliance with the attributes of each of the one or more OSS components comprised therein, adaptively learning the one or more OSS components and the attributes associated thereof comprised in the comprehensive report (R5) and updating the second OSS database (DB2); and determining that the one or more OSS components that are selected for a final deliverable based on the final attribute, wherein the one or more OSS components that are selected for the final deliverable are either compiled with the proprietary component or not compiled with the proprietary component but are part of the final deliverable and accordingly a list is created for the OSS components that are complied with the proprietary component and another list for the OSS components which are part of the final deliverable but are not compiled.

2. The processor implemented method of claim 1, further comprising:

a first report (R1) pertaining to the one or more unidentified components;

a second report (R2) pertaining to the one or more OSS components in the product having the strong copyleft license;

a third report (R3) pertaining to the one or more OSS components in the product having the weak copyleft license; and a fourth report (R4) pertaining to the one or more OSS components in the product having the permissive license.

3. The processor implemented method of claim 2, wherein the one or more pre-defined rules comprise:

rejecting an OSS component if associated with the strong copy left license;

approving an OSS component for inclusion in the second OSS database (DB2) if associated with the weak copy left license and the usage type is one of the library not compiled with the product or the file not compiled with the product;

rejecting an OSS component if associated with the weak copy left license and the usage type is one of the library compiled with the product or the file compiled with the product;

rejecting an OSS component if associated with the weak copy left license and the usage type is the snippet; and approving an OSS component for inclusion in the second OSS database (DB2) if associated with the permissive license and the usage is one of the library, the snippet or the file.

4. The processor implemented method of claim 3, wherein generating the comprehensive report (R5) comprises:

combining the first report (R1), the second report (R2), the third report (R3) and the fourth report (R4); and computing the final attribute wherein the final attribute is "Y" or "N" for each of the one or more OSS components in the product based on the one or more pre-defined rules corresponding to approving or rejecting of the OSS component respectively and wherein a "Y" for all of the one or more OSS components in the product is indicative of compliance with the attributes of each of the one or more OSS components comprised therein.

5. A system comprising:

one or more data storage devices (102) operatively coupled to one or more hardware processors (104) and configured to store instructions configured for execution by the one or more hardware processors to:

receive, a product embedded with one or more Open Source Software (OSS) components;

compare each of the one or more OSS components in the product with OSS components available in the public domain and comprised in a first OSS database (DB1) to identify one or more matches therebetween based on attributes associated thereof;

categorize, the one or more OSS components in the product having a match with the OSS components available in the first OSS database (DB1) as (i) OSS components having a strong copyleft license, (ii) OSS components having a permissive license or (iii) OSS components having a weak copyleft license;

identify a license usage type for the one or more OSS components in the product categorized as having the weak copyleft license and the permissive license, wherein an OSS usage type is one of a snippet, a file or a library and wherein the library is further identified as one of a library-executable or a library-binary type;

define the OSS usage type of the one or more OSS components as snippets (Snip), file (Fil), a Static library (Comps), a dynamic library(Compd), and determining if a component is modified, wherein when the usage type is the snippets (Snip) for the OSS component then the component to have attribute of modification, and the snippets (Snip) is indicative of one or more attributes for the one or more OSS components used as part of software development and wherein the Static library (Comps) and the dynamic library (Compd) is indicative of one or more listed open source components being used as part of software development;

identify as one or more unidentified components, the one or more OSS components in the product having no match with the OSS components available in the first OSS database (DB1) or having a match but characterized by at least one missing attribute;

periodically compare the one or more unidentified components with the OSS components in the first OSS database (DB1) to identify one or more new matches, wherein the OSS components available in the public domain and comprised in the first OSS database (DB1) are updated continually based on information available in a world wide web;

update a second OSS database (DB2) comprising at least some of the one or more OSS components in the product having the one or more new matches wherein, the one or more new matches and the one or more unidentified components are categorized as at least one of the one or more proprietary components and OSS components being previously available in the public domain;

perform an OSS compliance analyses for the one or more OSS components in the product based on the usage type, the attributes associated thereof comprised in the second OSS database (DB2) and one or more pre-defined rules, wherein the attributes are stored in the second OSS database (DB2) in a pre-defined format that facilitates in faster retrieval of information from the second OSS database (DB2), wherein the attributes stored in the second OSS database (DB2) in the predefined format include OSS component name, followed by OSS component version, followed by OSS component home page URL, followed by OSS component license type, followed by OSS component license URL, followed by OSS component attribution note, followed by the license usage type, followed by commercial distribution permission, followed by OSS component compile permission, followed by license compatibility with the OSS component license type associated with other OSS components comprised in the product or compatibility with proprietary license;

generate a comprehensive report (R5) based on the OSS compliance analyses, wherein the comprehensive report (R5) includes a final attribute for each of the one or more OSS components in the product indicative of compliance with the attributes of each of the one or more OSS components comprised therein;

adaptively learn the one or more OSS components and the attributes associated thereof comprised in the comprehensive report (R5) and update the second OSS database (DB2); and determine that the one or more OSS components that are selected for a final deliverable based on the final attribute, wherein the one or more OSS components that are selected for the final deliverable are either compiled with the proprietary component or not compiled with the proprietary component but are part of the final deliverable and accordingly a list is created for the OSS components that are complied with the proprietary component and another list for the OSS components which are part of the final deliverable but are not compiled.

6. The system of claim 5, wherein the one or more hardware processors are further configured to generate one or more reports comprising:

a first report (R1) pertaining to the one or more unidentified components;

a second report (R2) pertaining to the one or more OSS components in the product having the strong copyleft license;

a third report (R3) pertaining to the one or more OSS components in the product having the weak copyleft license; and a fourth report (R4) pertaining to the one or more OSS components in the product having the permissive license.

7. The system of claim 6, wherein the one or more pre-defined rules comprise:

rejecting an OSS component if associated with the strong copy left license;

approving an OSS component for inclusion in the second OSS database (DB2) if associated with the weak copy left license and the usage type is one of the library not compiled with the product or the file not compiled with the product;

rejecting an OSS component if associated with the weak copy left license and the usage type is one of the library compiled with the product or the file compiled with the product;

rejecting an OSS component if associated with the weak copy left license and the usage type is the snippet; and approving an OSS component for inclusion in the second OSS database (DB2) if associated with the permissive license and the OSS usage is one of the library, the snippet or the file.

8. The system of claim 7, wherein the one or more hardware processors are further configured to generate the comprehensive report (R5) by:

combining the first report (K1), the second report (K2), the third report (K3) and the fourth report (R4); and computing the final attribute wherein the final attribute is "Y" or "N" for each of the one or more OSS components in the product based on the one or more pre-defined rules corresponding to approving or rejecting of the OSS component respectively and wherein a "Y" for all of the one or more OSS components in the product is indicative of compliance with the attributes of each of the one or more OSS components comprised therein.

9. The method of claim 1, further comprising intelligently creating a matrix by analyzing the one or OSS components to further identify at least one OSS component to be compiled in a final deliverable, wherein the analysis of the one or more components enables checking of inter-license compatibilities, compliance and distribution of the final deliverable and wherein checking of inter-license compatibilities ensures that the one or more OSS components retain in the final deliverable.

10. The system of claim 5, wherein the one or more hardware processors are further configured to intelligently create a matrix by analyzing the one or more OSS components to further identify at least one OSS component to be compiled in a final deliverable, wherein the analysis of the one or more components enables checking of inter-license compatibilities, compliance and distribution of the final deliverable and wherein checking of inter-license compatibilities ensures that the one or more OSS components retain in the final deliverable.

* * * * *